Sept. 24, 1929.    M. H. TONCRAY    1,729,231
DOOR BUMPER
Filed April 8, 1926

INVENTOR=
Millard H. Toncray,
by Macleod, Calver, Copeland & Dike,
Attys.

Patented Sept. 24, 1929

1,729,231

UNITED STATES PATENT OFFICE

MILLARD H. TONCRAY, OF DETROIT, MICHIGAN, ASSIGNOR TO HUDSON MOTOR CAR COMPANY, OF DETROIT, MICHIGAN, A CORPORATION OF MICHIGAN

DOOR BUMPER

Application filed April 8, 1926. Serial No. 100,586.

This invention relates especially, although not exclusively, to bumpers or cushioning devices for the doors of metal automobile bodies.

It is customary in automobile bodies to provide resilient bumpers for cushioning the impact between the door and door jamb, said bumpers also serving to prevent rattling of the parts when the door is closed. To the latter end, it is desirable that the bumpers be adjustably mounted in order to enable them to relatively and resiliently position the cooperating latch elements on the door and door post or pillar without lost motion.

The present invention has among its objects to provide a simple and inexpensive bumper of this character which can be easily and securely fastened to a metal door or body pillar, which, except for its operative or impact receiving portion, is housed within and concealed by the pillar, which can be quickly and easily adjusted for the purpose above referred to, and whose relatively movable parts are so connected and self-retained as to facilitate the attachment and removal of the bumper.

The foregoing and other objects of the invention, together with means whereby the latter may be carried into effect, will best be understood from the following description of a preferred embodiment thereof illustrated in the accompanying drawings. It will be understood, however, that the particular construction described and shown has been chosen for illustrative purposes merely, and that the invention, as defined by the claims hereunto appended, may be otherwise embodied without departure from the spirit and scope thereof.

Figure 1:
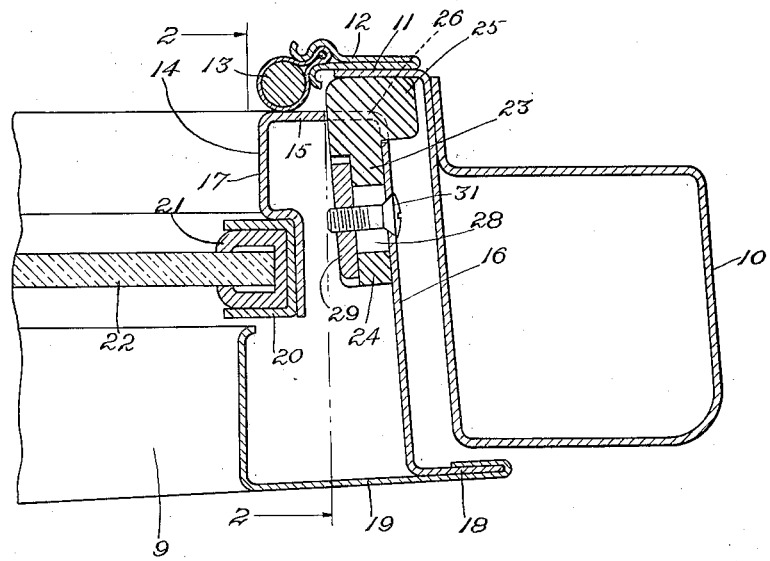
Fig. 1 is a fragmentary horizontal section of the free edge of an automobile door, together with the cooperating door post or body pillar and associated parts.
Figure 2:
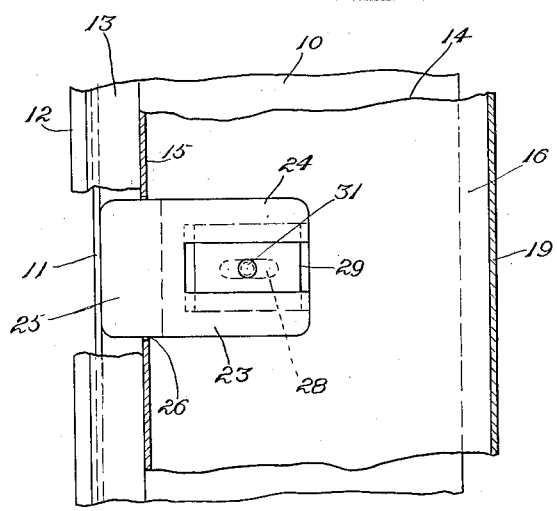
Fig. 2 is a section taken substantially on line 2—2, Fig. 1.
Figure 3:
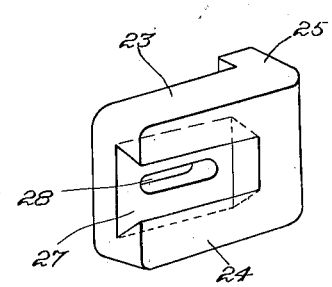
Fig. 3 is a detail perspective view of the bumper block.
Figure 4:
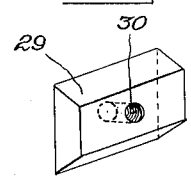
Fig. 4 is a similar view of the clamping plate or nut.

In Figs. 1 and 2, the invention is shown as applied to the door of a closed metal automobile body having a sheet metal door post or pillar 10 formed with a flange 11 constituting a door jamb and carrying a retainer 12 for a windlace 13 herein shown as of the type more fully described in another application filed April 8, 1926, Serial No. 100,587, said windlace engaging the interior of the door adjacent the free edge of the latter. The door, as shown, includes a pillar 14 located at the free edge of the door, said pillar being composed of sheet metal and of a suitable section to provide an inner web 15 and legs or flanges 16 and 17. The flange 16 extends transversely of the door at the free edge of the latter and is formed with a lip 18 overlying the pillar 10 and about which is crimped the edge of an outside panel 19 having a window opening 9. The flange 17 of the pillar 14 defines one edge of the window opening at the inner side of the door and has secured thereto window guides 20 containing rubber or other runs 21 for the window glass 22. Except as hereinafter pointed out, the parts above referred to may be of any usual or suitable construction and arrangement.

The bumper to which the present invention relates comprises a block 23 of suitable cushioning material, preferably rubber, said block being preferably of the L-shaped form shown and comprising a shank portion 24 secured to the inner face of one wall of the door pillar 14, herein the wall formed by the flange 16, and having an enlarged head 25 which projects through an opening 26 formed in the wall of the pillar at the angle between the web 15 and flange 16 into a position to engage the jamb 11 when the door is closed. The shank portion 24 of the block 23 is formed on its inner side with a dovetailed or otherwise undercut groove 27 with which communicates a slot 28 extending entirely through the block. Slidably mounted in the groove 27 is a nut or clamping plate 29 shaped to fit said groove and having a threaded opening 30 engaged by the threaded end of a screw 31 extending through an opening in the flange 16 and through the slot 28 in the block 23.

In assembling the parts, the nut 29 is placed in the undercut groove 27, the shank 24 of the block 23 inserted through the opening 26 in the pillar 14, and the screw 31 introduced through the opening in the flange 16 and the slot 28 of the block 24 and engaged with the threaded opening 30 in the nut 29. Said screw is thereafter tightened to clamp the block 23 between the plate or nut 29 and the flange or wall 16. In order to adjust the bumper it is only necessary to loosen the screw 31 and move the block 23 inwardly or outwardly, the nut 29 sliding in the groove 27 to permit this movement, and thereafter to tighten the screw 31, thereby clamping the parts in readjusted position.

It will be seen that the bumper is of very simple and inexpensive construction, comprising only three parts, namely, the block 23, the clamping plate or nut 29, and the screw or fastener 31, and that none of these parts requires permanent attachment to the pillar. It will also be seen that the self-retaining engagement of the nut or plate 29 in the undercut groove 27 permits the shank of the block 23 to be inserted with said nut or plate assembled therewith into the inside of the pillar and to be secured in this relatively inaccessible position by the screw 31. It will further be seen that, if it be desired to remove the bumper, for purposes of renewal or otherwise, removal of the screw 31 will permit the nut or plate 29 to be withdrawn with the block 23, so that, while this nut or plate is a loose part in the sense that it is not secured to the pillar or otherwise permanently attached, it cannot be so disengaged as to fall down within the pillar and be lost.

Having thus described my invention, I claim:

1. The combination with a pillar, of a door bumper comprising a block of cushioning material, a clamping plate having sliding engagement with said block, and a fastener engaging said plate, said block and plate having interengaging portions adapted to hold the same in assembled relation when said fastener is removed.

2. A door bumper comprising a block of cushioning material having an undercut groove and a slot communicating therewith, a nut in said groove, and a clamping screw extending through said slot and in threaded engagement with said nut.

3. The combination with a pillar including a door jamb and a door having a pillar cooperating with said jamb, one of said pillars being composed of sheet metal and having an opening in its wall, of a bumper comprising a block of cushioning material secured to the inner face of the wall and projecting through said opening, a clamping plate having self-retaining engagement with the inner side of said block, and a fastener extending through said wall and directly engaging said plate to clamp said block between said plate and wall.

4. The combination with a pillar including a door jamb and a door having a pillar cooperating with said jamb, one of said pillars being composed of sheet metal and having an opening in its wall, of a bumper comprising a block of cushioning material secured to the inner face of the wall and projecting through said opening, a loose clamping plate having self-retaining sliding engagement with said block at the inner side, and a fastener extending through said wall and block and engaging said plate to clamp said block between said plate and wall.

5. The combination with a pillar including a door jamb and a door having a pillar cooperating with said jamb, one of said pillars being composed of sheet metal and having an opening in its wall, of a bumper comprising a block of cushioning material secured to the inner face of the wall and projecting through said opening, said block having an undercut recess on its inner side and an opening extending therethrough and communicating with said recess, a nut in said recess, and a screw extending through said wall and opening and in threaded engagement with said nut to clamp said block between said nut and wall.

6. A door bumper comprising a block of cushioning material having a slot therethrough, a clamping plate having sliding engagement with said block, and a fastener extending through said slot and in threaded engagement with said plate, said block and plate having interengaging portions adapted to hold the same in assembled relation when said fastener is removed.

7. A door bumper comprising a block of cushioning material having a slot therethrough, a clamping member, one of said elements having an undercut groove and the other of said elements having a portion slidably engaged in said groove, and a fastener extending through said slot and engaging said clamping member.

In testimony whereof I affix my signature.

MILLARD H. TONCRAY.